United States Patent [19]

van Dyke

[11] 3,981,835

[45] Sept. 21, 1976

[54] METHOD OF MAKING A SET WATER-IN-OIL EMULSION INCLUDING A CONTINUOUS RESIN PHASE

[75] Inventor: John C. van Dyke, Oklahoma City, Okla.

[73] Assignee: Woods Research and Development Corporation, Oklahoma City, Okla.

[22] Filed: July 1, 1971

[21] Appl. No.: 159,002

Related U.S. Application Data

[62] Division of Ser. No. 850,629, Aug. 15, 1969, Pat. No. 3,635,289.

[52] U.S. Cl. .......................... 260/29.6 NR; 260/7.5; 260/16; 260/29.6 R; 260/40 R; 260/861
[51] Int. Cl.² .......................................... C08L 51/08
[58] Field of Search ............... 260/29.6 NR, 29.6 R, 260/861, 40 R

[56] References Cited
UNITED STATES PATENTS

| | | | |
|---|---|---|---|
| 2,252,271 | 8/1941 | Mathis | 260/861 |
| 2,443,735 | 6/1948 | Kropa | 260/29.6 NR |
| 3,256,219 | 6/1966 | Will | 260/29.6 NR |
| 3,591,191 | 7/1971 | Coderre et al. | 260/29.6 NR |
| 3,629,169 | 12/1971 | Bedighian | 260/29.6 NR |

*Primary Examiner*—Harold D. Anderson
*Attorney, Agent, or Firm*—Richards, Harris and Medlock

[57] ABSTRACT

Cavities such as cracks and various other voids in subsurface formations are sealed such as for example, to stop lost circulation of drilling fluid in a well bore by a process wherein an emulsion having a continuous phase containing a polymerizable component, a discontinuous phase of water, and a catalyst system for the polymerizable component is forced into and allowed to set within the cavity. The catalyst and inhibitor therefor within the catalyst system are selected so that the emulsion begins to gel and set up only after the emulsion reaches the cavity which is to be plugged. The emulsion will set up in the presence of formation fluids and yield a very hard, high strength cement-like material. The resulting hardened cement-like material contains at least about 60% water dispersed therein, and can be penetrated by a drill bit without cracking or chipping.

9 Claims, No Drawings

METHOD OF MAKING A SET WATER-IN-OIL EMULSION INCLUDING A CONTINUOUS RESIN PHASE

This is a division of application Ser. No. 850,629 filed Aug. 15, 1969, now U.S. Pat. No. 3,635,289.

This invention relates to a settable fluid useful as a hydraulic cement in well drilling operations. In another aspect, this invention relates to an improved method of filling cavities in earth formations.

Hydraulic cement compositions are utilized in the well drilling industry for a variety of purposes. For example, hydraulic cements are used to provide a positive seal between a well casing and the surrounding formation, and in squeeze cementing operations, and for sealing off drilling fluid "thief zones", and the like.

Cement slurries utilized in well drilling operations generally must (1) be capable of being placed at the desired position within the subsurface formation by conventional pumping operations, (2) be capable of setting and developing sufficient strength in a relatively short period of time after such placement, (3) yield a resulting hardened cement, which is sufficiently impermeable to drilling and formation fluids, (4) yield a resulting hardened cement which has sufficient strength to avoid mechanical failure, and will not deteriorate or decompose or otherwise lose its strength throughout the length of time it will be in use, and (5) yield a resulting hardened cement which is chemically inert to any fluid with which it may come into contact.

Most conventional well cements contain Portland cement as a principal constituent thereof. Various additives can be added to the cement slurry such as fluid loss agents, retarders, thickeners, surface active agents, and the like. However, even with the various additives, these conventional cements utilized in well drilling operations have various disadvantages. For example, it is very difficult to control the set time of the conventional cement slurry. Generally any motion of the conventional Portland cement slurry will prevent the cement from setting. Therefore, specialized techniques have been developed in order to prevent the usage of tremendous quantities of this cement when sealing voids and cracks within the formation for various reasons such as stopping lost circulation of a drilling fluid within a well bore. Additionally, since the conventional cement slurries comprise cementitious material dispersed within a continuous water phase, the use of these cement mixtures in highly porous formations results in rather weak final product material because of the tendency of the water to leach from the cement slurry before the cement has set. In addition, in operations which require that a cement plug be formed and then later drilled through, the latter drilling operation many times results in chipping and/or cracking of the cement being drilled. This is undesirable when it is necessary that an annular seal be formed by the resulting cement section.

Therefore, one object of this invention is to provide an improved material which is useful as a cement in well cementing operations.

Another object of this invention is to provide a novel method of filling and sealing a void in a subsurface formation.

A further object of this invention is to provide a novel method of filling a void in a subsurface formation with a settable water-in-oil emulsion which has an accurately controlled set time, and which will not leak water therefrom into the surrounding formation.

According to the invention, cavities within the earth such as for example, cracks and voids in a subsurface formation which communicate with a well bore, are sealed by pumping an emulsion comprising a continuous phase containing a polymerizable component, a discontinuous water phase, and a catalyst system into the cavity and allowing the emulsion to set therein to form a hard, dense, impermeable mass. The set time of the mass can be controlled by selection of the proper components within the catalyst system, including the catalyst, the promoter, and inhibitor.

In a preferred embodiment of this invention, the polymerizable component in the continuous phase of the emulsion comprises unsaturated polyester and the discontinuous water phase contains a non-ionic colloidal suspension agent. If desired, a weighting or filler material such as iron oxide, can be present in the settable composition.

According to a preferred method of this invention, the settable emulsion is produced by initially forming a first fluid comprising water containing the non-ionic colloidal suspension agent and the catalyst, for example, a peroxide catalyst thoroughly admixed therein. Next, a second fluid is formed comprising the polymerizable component having an initiator for the catalyst, and a promoter for the catalyst thoroughly admixed therein. After the formation of the two fluids, they are thoroughly intermixed to form the emulsion, having a continuous phase of the polymerizable component, and a discontinuous water phase.

The continuous polymerizable phase of the water-in-oil emulsion which is used in the scope of this invention can be the polymerizable organic liquid disclosed in U.S. Pat. No. 3,256,219, which patent is herein incorporated by reference. The preferred continuous oil phase comprises unsaturated polyester which generally includes polyesters of polybasic carboxylic acids and polyhydric alcohols preferably dibasic carboxylic acids and dihydric alcohols. Examples of suitable dihydric alcohols include ethandiol; 1,2 propanediol; 1,3 propanediol, diethylene glycol; and 1-allyl-2, 3-hydroxypropanediol. Examples of suitable unsaturated carboxylic acids include such alpha unsaturated dicarboxylic acids as maleic acid and fumaric acid. In the preferred embodiment, the unsaturated polyester can be carried within a monomer solvent such as for example, acrylonitrile, styrene, methylmethacrylate, and the like, and mixtures thereof. Examples of suitable commercially available resin compositions include the resin compositions sold under the trademark of AROPOL WEP sold by the Ashland Chemical Company of Columbus, Ohio.

The catalyst system for the polymeric materials can include such systems which are conventionally employed in emulsion polymerization and include the peroxides with suitable promoters. Generally the catalyst and promoters are employed in quantities from about 0.1 % to about 10 % by weight, respectively, of the total emulsion. Suitable catalysts include methyl ketone peroxide, acetylacetone peroxide, methyl ethyl ketone peroxide, dibutylperoxy cyclohexane, and t-butyl perbenzoate. Preferred catalyst systems include benzoyl peroxide promoted by dimethyltoluidine and a mixture of a ketone peroxide and hydrogen peroxide promoted with cobalt octoate and dimethyl aniline. Suitable catalyst inhibitors can be used such as the quinones, e.g., methyl tertiarybutyl hydroquinone and carus hydroquinone. Other inhibitors include butylated hydroxytoluene. Any other inhibitor known in the art which is non-deleterious to the emulsion can be utilized. The inhibitors can be employed in any convenient amount up to about 2000 PPM of the water-in-oil emulsion.

The settable emulsion can be admixed in conventional mixing equipment, and delivered to the appropriate place within the subsurface formation by conventional hydraulic cement pumping equipment.

Preferably, the emulsion utilized in this invention is admixed by forming a first fluid comprising the water (which will ultimately be the discontinuous phase of the emulsion), and a non-ionic colloidal suspension agent. Suitable suspension agents include hydroxyethyl cellulose, sodium carboxymethyl cellulose, methylcellulose, natural gums such as Guar, Karaya, and the like, and various colloidal proteins such as the protein sold under the trademark of SPC by Swift and Co. Generally this non-ionic colloidal suspension agent will be added to the water in an amount which ranges from about 0.5 to about 5% of the total weight of the emulsion to be formed. After the water-suspension agent fluid is formed, the catalyst is then added and admixed thoroughly therewith. Next, a second fluid is formed by admixing the polymerizable material with a suitable promoter (for the catalyst in the first fluid) and a suitable inhibitor for the catalyst system. After the two fluids are formed, they are thoroughly admixed to form the water-in-oil emulsion which is utilized in the scope of this invention. The discontinuous water phase generally comprises at least about 60 weight percent of the emulsion. Suitable proportions of water range from about 60 to about 80 weight percent of the emulsion with corresponding amounts of the continuous resin phase ranging from about 40 to about 20 weight percent of the emulsion.

After the water-in-oil emulsion has been mixed, it can then be placed within the cavity to be sealed by conventional hydraulic cement placement techniques. For example, during a well drilling operation, when it is found that the drilling fluid is being lost to a "thief zone" within a porous formation, the water-in-oil emulsion can be mixed on site and utilized to stop the lost circulation. In this instance, both the particular type and amount of catalyst, promoter, and inhibitor, are selected so that the emulsion will not gel under the particular temperature conditions until it reaches the level in the bore hole at which the drilling fluid is being lost. Thus, these components are selected to yield a gel time under the particular temperature conditions which substantially corresponds to the period of time it will take to pump the water-in-oil emulsion to the "thief zone" which has removed the drilling fluid from the bore hole. In this manner, the water-in-oil emulsion will set and harden when it reaches and fills the cavity communicating between the "thief zone" and the bore hole. In this regard, it must be noted that this method is a definite improvement over conventional methods of sealing off "thief zones" with conventional cement slurries because the conventional cement slurries will not gel as long as they are subjected to movement. However, the water-in-oil emulsion utilized in this invention will set independently of movement. Thus, no specialized technique is needed such as initially filling the cavity communicating with the "thief zone" with particulate material prior to the cementing operation, and far less of the water-in-oil emulsion is necessary to complete the sealing operation than is necessary when using a conventional cement slurry.

This invention can be utilized in any other well cementing operation. For example, the water-in-oil emulsion can be utilized to seal a casing within a bore hole. The casing can be suspended in the bore hole, and the water-in-oil emulsion can be formed and delivered to the bore hole adjacent the bottom of a casing by means of a hollow drill stem. Further pumping of the emulsion will thereby force it upwardly in the annular space formed between the casing suspended in the bore hole and the earthen walls of the bore hole. The use of the water-in-oil emulsion is superior to the use of conventional cement slurries in that the water contained within the emulsion will not leach therefrom when contact is made with a porous earthen formation; whereas, water is known to leach from conventional cement slurries into a porous formation and yield a weak formed cement. In contrast, portions of the water-in-oil emulsion will penetrate a porous structure and set to form a very tenacious seal therebetween. Thus, these materials will penetrate filter cakes of colloidal drilling muds such as bentonite clays which have been built upon the walls of a bore hole and thereby provide a very efficient seal between the casing and the earthen walls of the bore hole.

In some operations, wherein the outside periphery of the casing has obtained a film of petroliferous material thereover, there results a thin oily film between the set emulsion and the periphery of the casing. In this instance, the casing can be removed from the bore hole by pulling it therefrom to yield a permanent casing of the set emulsion, which has very high strength and durability. Alternately, the bore hole can be filled with the emulsion, allowed to set, and then drilled to leave a permanent casing of the gelled emulsion.

If desired, when cementing in the presence of extreme pressures, a particulate, non-ionizable weighting material can be added to the emulsion to add increased weight thereto. Any particulate non-ionizable inert material having a mesh size in the range of from 4 to 20 microns can be used in the scope of this invention. For example any non-ionizable, inert, metal oxide can be used as the weighting material. The most preferred weighting material is iron oxide. Another suitable weighting material is Calcium Carbonate. The amount of weighting material added to the water-in-oil emulsion is generally not critical, but preferably the amount of this weighting material should not exceed the total weight of the water-in-oil emulsion. Thus, it has been found that such weighting material can be utilized in amounts ranging from about 1 to about 100 parts by weight based upon 100 parts by weight of the water-in-oil emulsion.

After the water-in-oil emulsion is delivered to the earthen cavity to be sealed, the mixing and pumping equipment and piping should be flushed with a suitable detergent solution, for example, an aqueous solution of a commercially available detergent such as an alkyaryl sulfonate. Generally sufficient detergent should be placed in aqueous solution to emulsify and remove any deposits of the water-in-oil emulsion remaining in the mixing and pumping equipment, and in the piping. It is generally sufficient to add from about 0.01 % to 0.1% by weight of detergent to the flush water.

This invention can be understood more easily from the study of the following examples which are given for illustrative purposes only and are not intended to limit the scope of this invention:

EXAMPLE 1

Several cavities were sealed with approximately 2200 pounds of water-in-oil emulsion according to the following procedure which was conducted at an average temperature of about 95° F:

Initially, 165 gallons of water (1376 pounds) were added to a large heavy duty oil field hydraulic cement mixer. Next, 6.88 pounds of hydroxyethyl cellulose (which is sold under the trademark of "CELLOSIZE") was thoroughly admixed with the water within the tank until the hydroxyethyl cellulose was completely dissolved therein. After this, 6.88 pounds of a catalyst solution consisting of 1232 cc of hydrogen peroxide, 284 cc of methyl ketone (sold under the trademark of "DSW" by Lupersol Company) in 380 cc of water was added to the resulting solution and thoroughly admixed therein to form a water-catalyst mixture. At this point, the water-catalyst mixture was drained into three 55-gallon drums.

Next, 950 pounds of an unsaturated polyester resin mixture sold under the trademark of "AROPOL WEP 26" by the Ashland Chemical Company, was added to the hydraulic cement mixer. After this, 160 grams of an inhibitor-solvent solution was added. This inhibitor-solvent consisted of 20 weight percent tertiary butyl hydroquinone in 2-methyoxy ethanol and resulted in 800 parts per million of inhibitor in the resin. Next, promoters for the catalyst contained within the catalyst-water mixture were added to the resin mixture. The promoters consisted of 3003 grams of a 12 weight % cobalt octoate solution in 2-methyoxy ethanol, and 1037.5 grams of dimeythylaniline. The resulting resin-inhibitor-promoter mixture was thoroughly admixed for about 2 minutes.

Next, the water-catalyst mixture in the 55 gallon drums was slowly added to the resin within the mixer and continuously mixed for about 25 minutes to yield a very good homogenous water-in-oil emulsion. After this, the resulting emulsion was circulated for several minutes through large centrifugal pumps. This process did not result in the breaking of the water-in-oil emulsion, and in fact, the emulsion became highly homogeneous during the procedure. The emulsion was next allowed to sit (without mixing) for 1.5 hours and then poured into the cavities and allowed to set. After this, the piping and centrifugal pumps and mixer were thoroughly flushed with about a 1-weight % aqueous solution of a detergent (Tide) to remove residual amounts of the emulsion therefrom.

The resulting emulsion set to form very hard, high strength material containing water dispersed therein.

EXAMPLE 2

A series of runs were carried out to illustrate the controllability of the set times of the water-in-oil emulsions utilized in this invention. Basically, 27 samples of a water-in-oil emulsion using the AROPOL WEP 26 resin and 60 weight % water were admixed according to the basic procedure outlined in Example 1. However, the amount of inhibitor and the type of catalyst in each sample were varied to indicate that the set times of the resin can be easily controlled. In each of the runs outlined in Table I below, the promoter system utilized was 1.2 weight % (of the emulsion) cobalt octoate, and 0.5 weight % (of the emulsion) of dimethylaniline.

Catalyst A was 0.5 weight % (of the emulsion) of ketone peroxide, catalyst B was 0.75 weight % (of the emulsion) of acetylacetone peroxide, and catalyst C was 0.5 % (of the emulsion) of methyl ethyl ketone peroxide. The inhibitor used in all runs was methyl tertiarybutyl hydroquinone.

TABLE I

| INHIBITOR | Set Time (Minutes) | | |
|---|---|---|---|
| | CATALYST A | CATALYST B | CATALYST C |
| (P.P.M.) | | | |
| 750 | 250 | long | 210 |
| 625 | 236 | 500 | 175 |
| 500 | 205 | 360 | 150 |
| 400 | 130 | 300 | 130 |
| 300 | 100 | 210 | 104 |
| 200 | 80 | 160 | 75 |
| 100 | 60 | 106 | 44 |
| 50 | 42 | 64 | 26 |
| 0 | 11 | 35 | 11 |

Thus, it is clearly illustrated that the set time of the particular water-in-oil emulsion utilized in the scope of this invention is easily controlled by the amount of inhibitor, and the type of catalyst. It is noted that the above experiments were carried out in an average temperature of between 70° and 80°F. Various other calibration runs can be carried out at any pertinent temperature which is either higher or lower than the temperatures outlined in the above runs. In essence, the method of controlling the set times is generally not critical, and a set time for any particular catalyzed emulsion composition is controlled as it is a function of (a) the proportion of resin to water (b) the kind of catalyst or combination of catalysts, (c) the amount of inhibitor and kind of inhibitor, and (d) the temperature at the mixer and at the location of the cavity to be sealed within the formation.

Thus, while this invention has been described in relation to its preferred embodiments, it is clear that various modifications thereof will now become apparent to one skilled in the art upon reading this specification, and it is intended to cover such modifications as fall within the scope of the appended claims.

I claim:

1. A method of making a set water-in-oil emulsion including a continuous resin phase which comprises from about 40 to about 20 weight percent thereof and a discontinuous water phase which comprises from about 60 to about 80 weight percent thereof from first and second fluids comprising:
   a. forming said first fluid which forms said continuous resin phase, said first fluid consisting essentially of an unsaturated polyester resin of an ethylenically unsaturated aliphatic dicarboxylic acid and a saturated aliphatic glycol, an ethylenically unsaturated monomer selected from the group consisting of acrylonitrile, styrene, and methyl methacrylate, and having an effective amount of a catalyst promoter therefor mixed thoroughly therewith;
   b. forming said second fluid consisting essentially of water with from about 0.5 to about 5 weight percent based on the total weight of said first and second fluids of a nonionic colloidal suspension agent thoroughly admixed therein, and an effective amount of a catalyst for said polymerizable component, thoroughly admixed therein; and c. thoroughly admixing said first and second fluids to form an emulsion and allowing said emulsion to set to form said set water-in-oil emulsion.

2. The method of claim 1 further comprising admixing an inhibitor for said catalyst in said first fluid.

3. The method of claim 1 wherein said first and second fluids are admixed by adding said second fluid to said first fluid while stirring the mixture thereof.

4. The method of claim 1 wherein said polymerizable component consists essentially of an unsaturated polyester resin of 1,2-propanediol and maleic acid, and styrene.

5. The method of claim 4 wherein said catalyst comprises benzoyl peroxide and said promoter comprises dimethyltoluidine.

6. The method of claim 4 wherein said catalyst comprises ketone peroxide and hydrogen peroxide and said promoter comprises cobalt octoate and dimethylaniline.

7. The method of claim 1 further comprising admixing a particulate inert nonionic filler having a particle size in the range of 4 to 20 microns with said emulsion.

8. The method of claim 7 wherein from 1 to 100 parts by weight of said filler material are added to each 100 parts by weight of said emulsion.

9. The method of claim 8 wherein said particulate inert nonionic filler material is iron oxide.

* * * * *